(12) United States Patent
Kondareddy (10) Patent No.: US 10,834,692 B2
(45) Date of Patent: Nov. 10, 2020

(54) DEVICES, SYSTEMS AND METHODS FOR SYNCHRONIZING EVENT WINDOWS IN WIRELESS NETWORK

(71) Applicant: Cypress Semiconductor Corporation, San Jose, CA (US)

(72) Inventor: Raghunatha Kondareddy, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/213,772

(22) Filed: Dec. 7, 2018

(65) Prior Publication Data

US 2020/0112934 A1 Apr. 9, 2020

Related U.S. Application Data

(60) Provisional application No. 62/741,153, filed on Oct. 4, 2018.

(51) Int. Cl.
*H04W 56/00* (2009.01)
*H04W 4/80* (2018.01)
*H04J 3/06* (2006.01)
*H04W 84/12* (2009.01)

(52) U.S. Cl.
CPC ....... *H04W 56/0025* (2013.01); *H04J 3/0644* (2013.01); *H04W 4/80* (2018.02); *H04W 56/003* (2013.01); *H04W 56/0015* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2003/0060161 A1* | 3/2003 | Park | ............... | H04L 69/24 455/41.2 |
| 2007/0226530 A1* | 9/2007 | Celinski | ............... | G06F 1/12 713/500 |
| 2008/0311852 A1* | 12/2008 | Hansen | ............... | H04W 88/06 455/41.2 |
| 2009/0003307 A1* | 1/2009 | Yang | ............... | H04W 56/00 370/350 |
| 2016/0011748 A1* | 1/2016 | Zheng | ............... | G06F 3/1454 345/173 |

OTHER PUBLICATIONS

International Search Report (Corrected) for International application No. PCT/US2019/047994 dated Oct. 4, 2019, 2 pages.
(Continued)

*Primary Examiner* — Adnan Baig (57) ABSTRACT

A method can include receiving a timing signal that is part of a first communication protocol; by operation of a master device operating according to a second communication protocol, determining event timing windows for a plurality of slave devices of the master device; and by operation of the master device, transmitting control packets to the slave devices, adjusting clock values in the slave devices to sequentially order the event timing windows within an event group window; wherein the event window is timed according to the timing signal. Related devices and systems are also disclosed.

20 Claims, 9 Drawing Sheets

(56) References Cited

OTHER PUBLICATIONS

International Search Report for International application No. PCT/US2019/047994 dated Oct. 4, 2019, 2 pages.
Written Opinion of the International Searching Authority for International application No. PCT/US2019/047994 dated Oct. 4, 2019, 14 pages.
Written Opinion of the International Searching Authority (Corrected) for International application No. PCT/US2019/047994 dated Oct. 4, 2019, 14 pages.

* cited by examiner

FIG. 15A
(BACKGROUND)

FIG. 15B
(BACKGROUND)

DEVICES, SYSTEMS AND METHODS FOR SYNCHRONIZING EVENT WINDOWS IN WIRELESS NETWORK

This application claims the benefit of U.S. provisional patent application having Ser. No. 62/741,153, filed on Oct. 4, 2018, the contents of which are incorporated by reference herein.

TECHNICAL FIELD

The present disclosure relates generally to wireless networks, and more particularly to wireless networks that reserve event timing windows for possible transactions between connected devices.

BACKGROUND

Conventional short range wireless networks, such as Bluetooth (BT) piconets, can enable devices to be placed into reduced power consumption states where devices only periodically monitor (e.g., "sniff") a medium for transmissions. While such capabilities can enable very low power operations, in networks having a combination device where BT circuits share a medium with other circuits (e.g., WLAN), the need to periodically monitor the medium can limit data throughput.

Figure 15A:
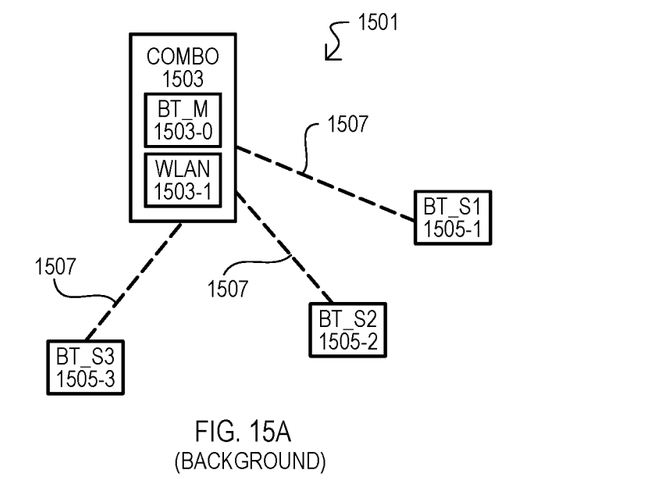
FIGS. 15A and 15B are diagrams showing a conventional piconet and timing.

FIG. 15A shows a conventional piconet 1501. Conventional piconet 1501 can include a combination device 1503 and a number of slave devices 1505-1 to -3 in communication via wireless connections 1507. A combination device 1503 can include a BT portion 1503-0, serving as a BT master, and a WLAN portion 1503-1. BT portion 1503-0 and WLAN portion 1503-1 can share a 2.4 GHz transmission medium.

Figure 15B:
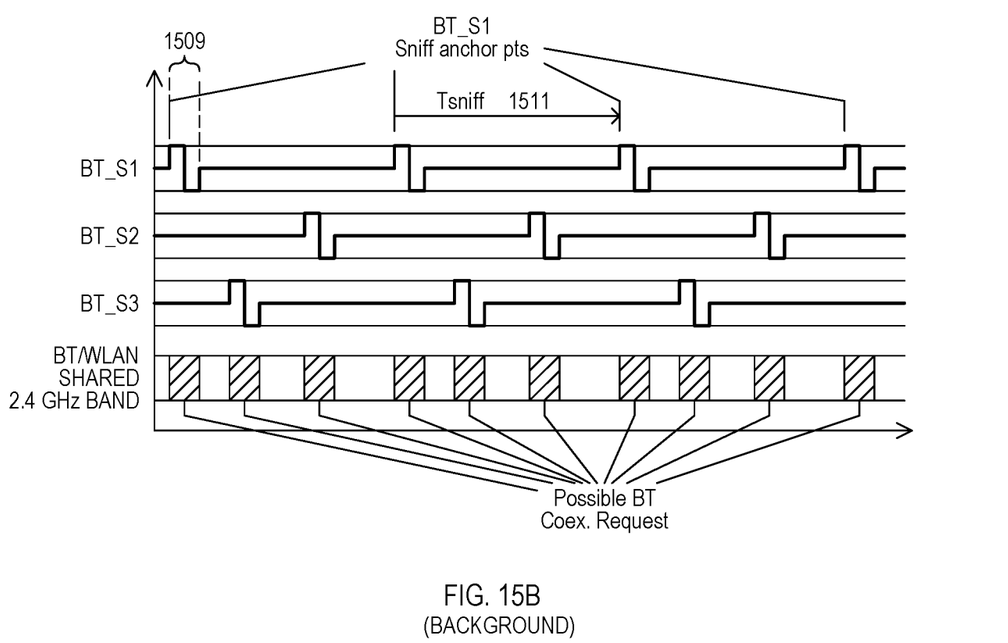

FIG. 15B is a timing diagram showing operations of the piconet 1501 shown in FIG. 15A. FIG. 15B includes waveforms for each BT slave (shown as BT_S1, BT_S2, BT_S3) as well as the shared medium. In FIG. 15B it is assumed that each BT slave has entered a sniff mode, and thus will only look for transmissions in a sniff window. Referring to waveform BT_S1, sniff windows (one shown as 1509) can occur at sniff anchor points with a frequency having a period of Tsniff 1511. In the event communications are to occur in a sniff window, the BT master 1503-0 will request to take control over the medium from the WLAN portion 1503-1 (a coexistence request). In most cases, such requests will have a high priority and thus take control over the medium if it is being used by the WLAN portion 1503-1.

As shown by the medium waveform, due to the various sniff windows, there can be numerous locations where BT portion 1503-0 can take control of the medium. This can reduce the consistent availability of the medium, thus reducing data throughput in the system. In particular, there can be chopping of aggregated media access control protocol data units (MPDU) of the WLAN portion 1503-1 as the medium is yielded for BT use.

It would be desirable to arrive at some way of improving data throughput in networks that employ combination devices, including but not limited to, combination BT-WLAN devices.

DETAILED DESCRIPTION

According to embodiments, systems can include a master device in wireless communication with a number of slave devices. A master device can be a combination device having collocated communication circuits that share a medium but operate according to different protocols. Slave devices can have event timing windows in which communications can take place with the master. A master device can send commands to the slave devices to aggregate event timing windows, which can increase a throughput in the system.

In some embodiments, slave devices can establish event timing windows based on slave clocks. A master device can "nudge" slave clocks to aggregate the event timing windows, moving the slave clocks in multiple operations by only limited amounts. Limiting the size of slave clock movement can prevent loss of synchronization of master-slave communications.

In some embodiments, a combination device can be Bluetooth (BT)-WLAN combination device that can operate as a BT master for a number of BT slaves.

In the various embodiments below, like items are referred to by the same reference characters, but with the leading digit(s) corresponding to the figure number.

Figure 1:
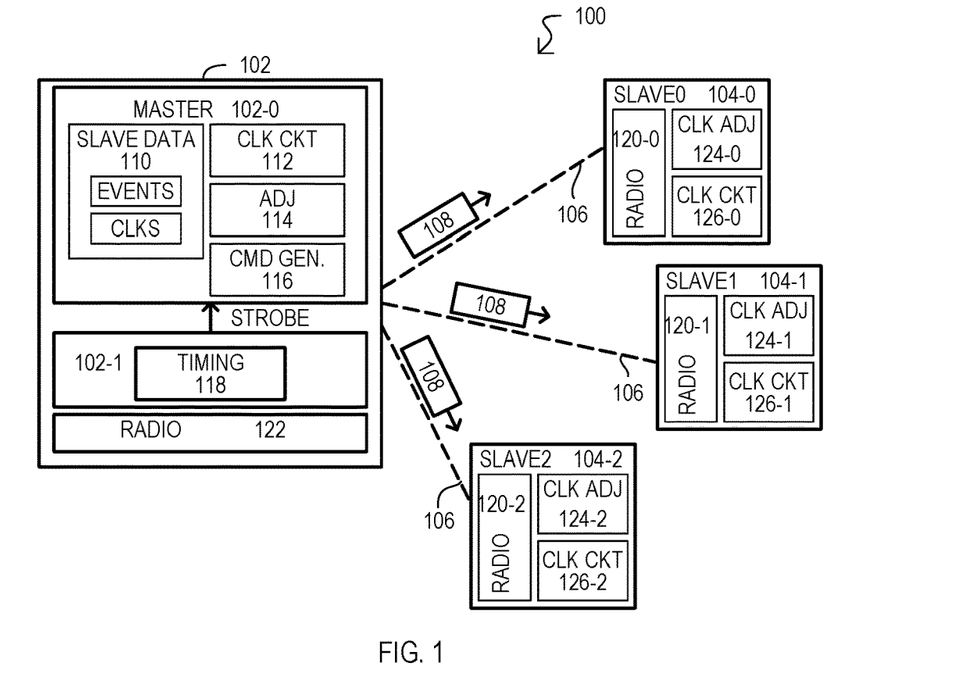
FIG. 1 is a block diagram of a wireless network according to an embodiment.

FIG. 1 is a block diagram of a system 100 according to an embodiment. A system 100 can include a master device 102 and a number of slave devices 104-0 to -2. A master device 102 can be in communication with slave devices (104-0 to -2) over wireless communication links 106. In some embodiments, master device can communicate with slave devices (104-0 to -2) according to a packet based protocol. Thus, a master device 102 can control a slave device (104-0 to -2) by transmitting packets 108.

Slave devices (104-0 to -2) can operate in one or more modes in which communications with a master 102 can occur in event windows separated in time. Slave devices (104-0 to -2) can each include a slave clock adjustor 124-0 to -2, a slave clock circuit 126-0 to -2, and slave radio 120-0 to -2. A slave clock circuit (126-0 to -2) can generate a slave clock for its slave device. The occurrence of event windows for the slave device can be based on the corresponding slave clock. A slave clock adjustor (124-0 to -2) can adjust the corresponding slave clock in response to inputs (e.g., commands, instructions, requests) received from a master device 102. In some embodiments, event windows for slaves can be periodic events. Slave radio circuits (120-0 to -2) can enable slave devices (104-0 to -2) to communicate with master device 102 according to a first protocol. Slave radio circuits (120-0 to -2) can include any suitable circuits according to a selected protocol, and in some embodiments can include physical interface (PHY) circuits and baseband circuits. In some embodiments, slave radio circuits 120 can transmit/receive on any internationally recognized industrial, scientific, medical (ISM) band. In some embodiments, radio circuits (120-0 to -2) can transmit and receive at a band around 2.4 GHz.

In some embodiments, a system 100 can have a star topology, however particular topologies should not be construed as limiting.

A master device 102 can include first circuits (e.g., master) 102-0, second circuits 102-1 and master radio circuits 122. First circuits 102-0 can store slave data 110 and include a master clock circuit 112, a clock adjustor 114, and a command generator 116. Slave data 110 can store data for slave devices (104-0 to -2). Such data can enable first circuits 102-0 to determine a timing of event windows for each slave device (104-0 to -2). In the embodiment shown, slave data can include event data EVENTS and slave clock data CLKS. Event data can indicate when event windows can occur relative slave clocks signals. Slave clock data CLKS can indicate slave clocks relative to a master clock running in the first circuits 102-0. In some embodiments, slave data 110 can be derived from data transmitted from slave devices (104-0 to -2).

A master clock circuit 112 can generate a master clock for controlling communication timing of communication links 106. In some embodiments, a master clock 112 can operate at the same rate of a slave clock. Clock adjustor 114 can utilize slave data 110 to determine a position of event windows of slave devices (104-0 to -2) with respect to a reference point. Such a reference point can be derived from a reference strobe STROBE generated by second circuits 102-1. From such slave data, clock adjustor 114 can determine how to adjust slave clocks and thereby move event timing windows to be aggregated together in a limited group window.

A command generator 116 can generate commands for controlling operations of slave devices (104-0 to -2), including commands which can adjust the clocks of the slave devices (104-0 to -2). In some embodiments, a master device 102 can adjust slave clocks of slave devices in an incremental (e.g., clock dragging or nudging fashion), in which clock adjustment commands can continue to be sent until an event window is determined to be at a desired location. However, in other embodiments, slave devices can make such clock changes in response to a single command.

Second circuits 102-1 can include a timing circuit 118 which can generate a reference strobe STROBE. As noted above, a reference strobe STROBE can be used to establish an aggregation point for the event windows. Timing circuit 118 can operate at a clock speed faster than master clock circuit 112.

Master radio circuits 122 can enable master device 102 to communicate with slave devices (104-0 to 104-2). In a particular embodiment, master radio circuits 122 can transmit and receive at more than one band. As but one of many possible examples, master radio circuits 122 can operate on a first band around 2.4 GHz to communicate with slave devices (104-0 to 104-2), and a second band around 5.0 GHz that is not used to communicate with slave devices (104-0 to 104-2).

Figure 2A:
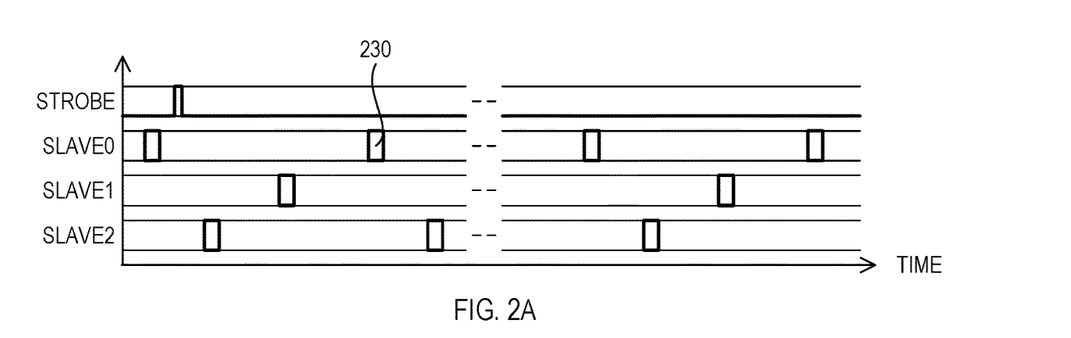
FIGS. 2A and 2B are timing diagrams showing an event window adjustment operation according to an embodiment.
Figure 2B:
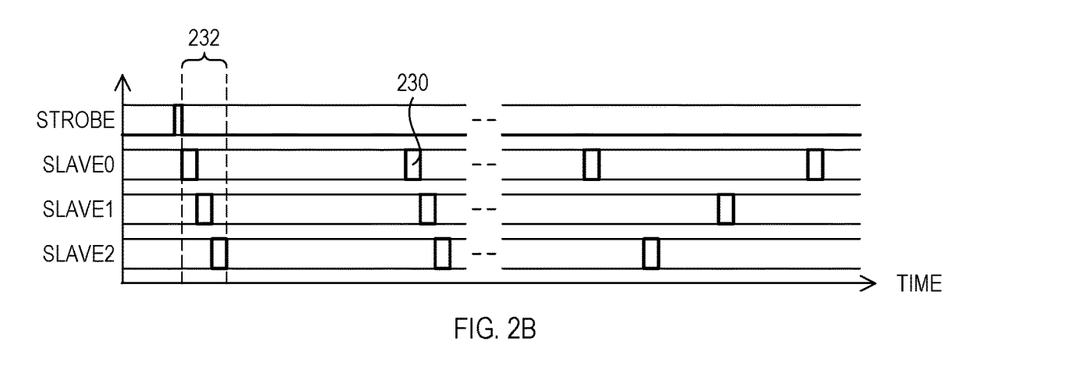

FIGS. 2A and 2B are timing diagrams showing operations according to embodiments. FIGS. 2A and 2B show waveforms for a strobe signal STROBE, as well as event windows for three slave devices SLAVE0, SLAVE1, SLAVE2. Referring to FIG. 2A, each slave device can have event windows (one shown as 230) that reoccur over time. Event windows can be time periods where communications can be initiated between a master device and the slave device. In some embodiments, slave devices can operate in modes where no communications are initiated except in event windows. A strobe signal STROBE can be used to time the aggregation of event windows. In some embodiments, slave devices can operate according to one protocol, and a strobe signal STROBE can be generated from the timing of another, different protocol. In some embodiments, slave devices can operate in modes where no communications are initiated except in event windows.

FIG. 2A shows event window timing for slave devices prior to an adjustment by a master device. Event windows (e.g., 230) can have various timings according to slave clocks running in their respective slave devices. As a result, a communication medium for the slave devices could be taken over by a data transfer operation at various points in time. In some embodiments, event windows can be periodic events.

FIG. 2B shows event window timing for slave devices after an adjustment by a master device. By operation of commands issued by the master device, a timing of event windows can be changed relative to strobe signal STROBE. As a result, event windows can be aggregated into a group window 232. As a result, the possibility of the medium being coopted by events can be limited to the time period of the group window. It is noted that while FIG. 2B shows group window 232 closely following the STROBE signal, a group window 232 can have any suitable relationship to the STROBE signal (e.g., lead or lag).

In some embodiments, first and second protocols can share a medium, and a controller of a combination device can yield the medium to first control circuits during a group window 232. That is, communications according to the first protocol can be permitted in the group window, while communications according to the second protocol can be limited or prohibited in the group window.

Figure 3:
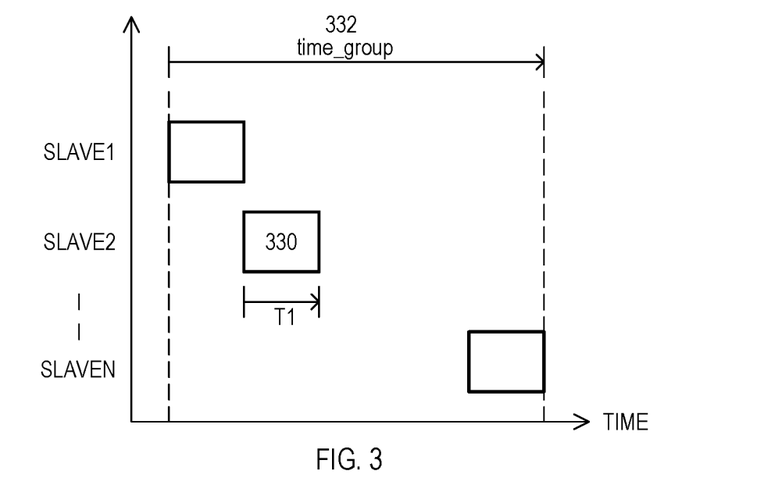
FIG. 3 is a timing diagram showing an aggregation of event windows according to an embodiment.

FIG. 3 is a timing diagram showing aggregated event windows according to an embodiment. FIG. 3 shows event windows (one shown as 330) after they have been aggregated in response to commands from a master device, including event windows for N slave device SLAVE1 to SLAVEN. The event windows can be aggregated into a group window 332 of duration time_group. A group window 332 duration can be any suitable duration that can improve throughput of a device. In some embodiments, time_group can be no greater than $3N*T1$, in other embodiments no greater than $2N*T1$, in still other embodiments no greater than $(N+2)*T1$. A group window can be conceptualized as having time slots that can be occupied by event windows. Such time slots can have a duration equal to, or longer than its corresponding event window.

Figure 4:
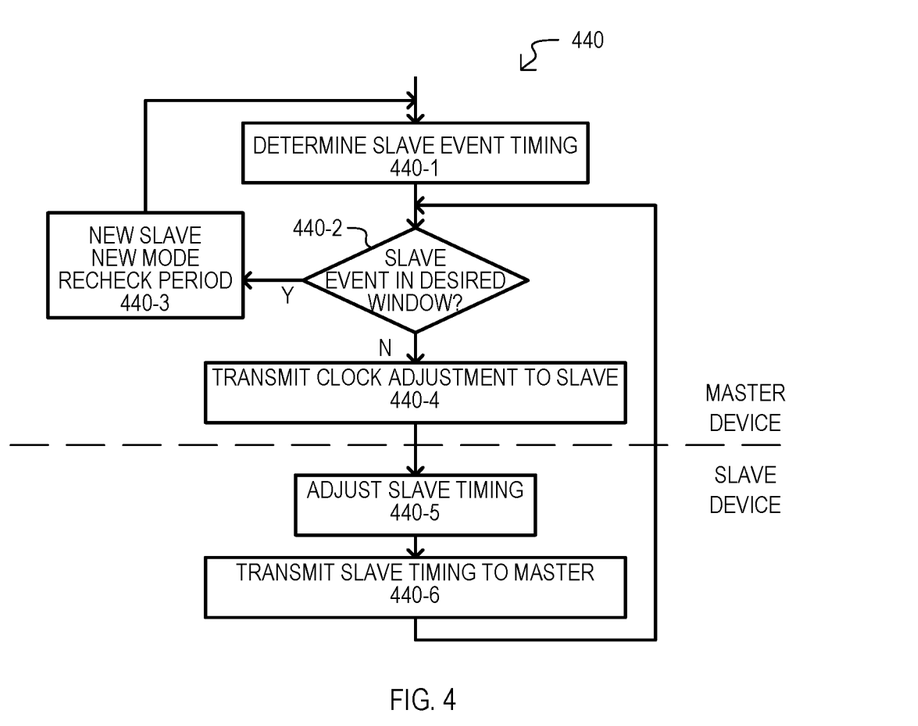
FIG. 4 is a flow diagram showing a method of adjusting event window timing according to an embodiment.

FIG. 4 is a flow diagram of method 440 executable by a system according to an embodiment. A method 440 can include determining a slave event timing 440-1. Such an action can include a master device receiving timing data from slave devices. In some embodiments, such an action can include a master device receiving packets that indicate an offset between a slave clock (running in the slave device) and a master clock (running in a master device), and where an event window will occur relative to the slave clock. A slave event timing can be checked to determine if it is in a group window 440-2 (i.e., a window in which event windows are aggregated). If the slave event is in the group window (Y from 440-2), a method 440 can wait until a new slave is connected, or an existing slave has entered a new mode that includes event windows, or a re-check (e.g., recalibrate) time period has passed 440-3, and return to 440-1.

If the slave event is not in the group window (N from 440-2), a method 440 can transmit a clock adjustment to the slave device 440-4. Such an action can include a master transmitting a sequence of clock adjustments to a slave device, to "drag" the slave clock to a desired position. Alternatively, such an action can include transmitting a desired group window location.

In response to a clock adjustment command, a slave device can adjust its timing 440-5 to thereby move its event window. As noted above, such an action can include a slave device receiving a sequence of clock adjustment commands, or just one command. A slave device can transmit timing data to a master device 440-6. Such an action can include a slave device returning timing data to indicate to a master device a position of an event window. In some embodiments, such an action can include transmitting a clock offset value that indicates a difference between a slave clock and a master clock.

Figure 5:
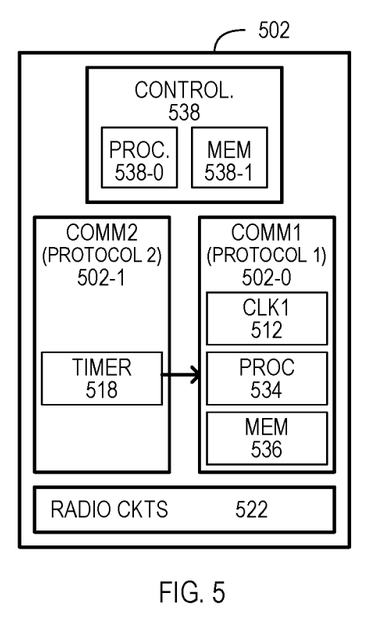
FIG. 5 is a block diagram of a combination device according to an embodiment.

FIG. 5 is a block diagram of a combination device 502 according to an embodiment. In some embodiments, a combination device 502 can be configured as a master device shown as 102 in FIG. 1. A combination device 502 can include a controller 538, first communication circuits 502-0, second communication circuits 502-1, and radio circuits 522. First communication circuits 502-0 can be wireless communication circuits compatible with a protocol that can support a first transmission range. First communication circuits 502-0 can include a clock circuit 512, communication processor 534, and communication memory 536. A clock circuit 512 can generate a clock signal for timing communications with other devices according to the first protocol. Communication processor 534 can include processing circuits for handling communications according the first protocol, including generating command data for altering event window timing in slave devices. Communication memory 536 can store data for use in communicating according to the first protocol, including slave data for determining timing of slave event windows.

Second communication circuits 502-1 can be wireless communication circuits compatible with a protocol that can support a second transmission range that is greater than the first transmission range. However, both first and second communication circuits 502-0/1 can share a medium, and request/relinquish or otherwise acquire control over the shared medium according to any of the embodiments described herein, or equivalents. Second communication circuits 502-1 can include a timer 518 from which a strobe signal for first communication circuits 502-0. In some embodiments, a first timer 518 can operate at a COMM2 clock rate substantially faster than that of the clock circuit 512 (a COMM1 clock rate). For example, a COMM2 clock rate can be at least 100 times faster than COMM1 clock rate, or a COMM2 clock rate can be at least 300 times faster than COMM1 clock rate.

In particular embodiments, first communication circuits 502-0 can be a BT portion of combination device 502 and second communication circuits 502-1 can be a WLAN portion of the combination device 502. Combination device 502 can be formed in a single integrated circuit substrate.

Referring still to FIG. 5, a controller 538 can include one or more processors 538-0 and a memory system 538-1. In some embodiments, controller 538 can control access to a shared medium based on requests from first and second communication circuit 502-0/1. In some embodiments, a controller 538, by operating second communication circuits 502-0 (e.g., WLAN), can transmit messages to other devices of its network operating according to the second protocol, to limit or inhibit communications in a group window (i.e., window in which event windows are aggregated). Freeing a shared medium for BT communications in the group window time period.

Radio circuits 522 can take the form of any of those described herein or equivalents.

Figure 6:
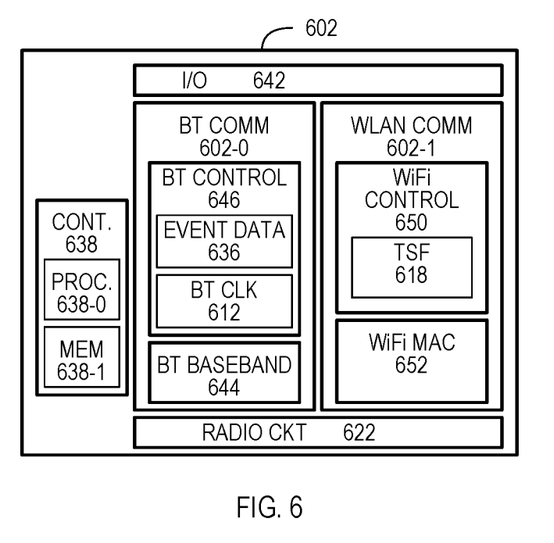
FIG. 6 is a block diagram of a Bluetooth (BT)-wireless local area network (WLAN) combination device according to an embodiment.

FIG. 6 is a block diagram of a combination device 602 according to another embodiment. In some embodiments, combination device 602 can be one particular implementation of master device shown as 102 in FIG. 1. A combination device 602 can include first communication circuits 602-0, second communication circuits 602-1, controller 638, radio circuits 622, and input/output (I/O) circuits 642. First communication circuits 602-0 can be BT circuits including BT control circuits 646 and BT baseband circuits 644. BT circuits can operate in a 2.4 GHz band according to one or more BT protocols. BT control circuits 646 can control BT operations, including the formation and transmission of BT packets. In the embodiment shown, BT control circuits 646 can store event data 636. From the event data 636, combination device 602 can determine slave events (e.g., sniffs) and issue appropriate adjustment packets to slave devices. BT control circuits 646 can also include a BT clock 612 to time BT communications. A BT clock 612 can operate at a clock speed of about 3.2 kHz.

Second communication circuits 602-1 can be WLAN circuits, including a WiFi control circuit 650 and WiFi media access control (MAC) circuits 652. WLAN circuits can also operate in a 2.4 GHz band and so can share the band with BT circuits. Second communication circuits 602-1 can include a time synchronization function (TSF) circuit 618. TSF circuit 618 can operate according to a 1 MHz clock. A strobe value can be generated from TSF circuit 618, from which a group window can timed. Event windows for slave devices can be aggregated within such a group window as described herein and equivalents. In some embodiments, second communication circuits 602-1 can also operate in a 5.0 GHz band.

In some embodiments, controller 638 can determine when to issue clock adjustment commands to slave devices to thereby move event windows by accessing data values stored in first communication circuits 602-0. In some embodiments, controller 638 can also control access to a shared 2.4 GHz band. In the particular embodiment shown, controller 638 can include one or more processors 638-0 and a memory system 638-1. A memory system 638-1 can include instructions executable by a processor(s) 638-0 to perform all or portions of the various methods described herein, and equivalents.

Radio circuits 622 can take the form of any of those described herein or equivalents.

I/O circuits 642 can enable control of combination device 602 by another system or person external to the combination device 602. I/O circuits 642 can include circuits that enable communication with the combination device according to any suitable method, including any of various serial data communication standards/methods including but not limited to: serial digital interface (SDI), universal serial bus (USB), universal asynchronous receiver transmitter (UART), I²C, or I²S.

Figure 7:
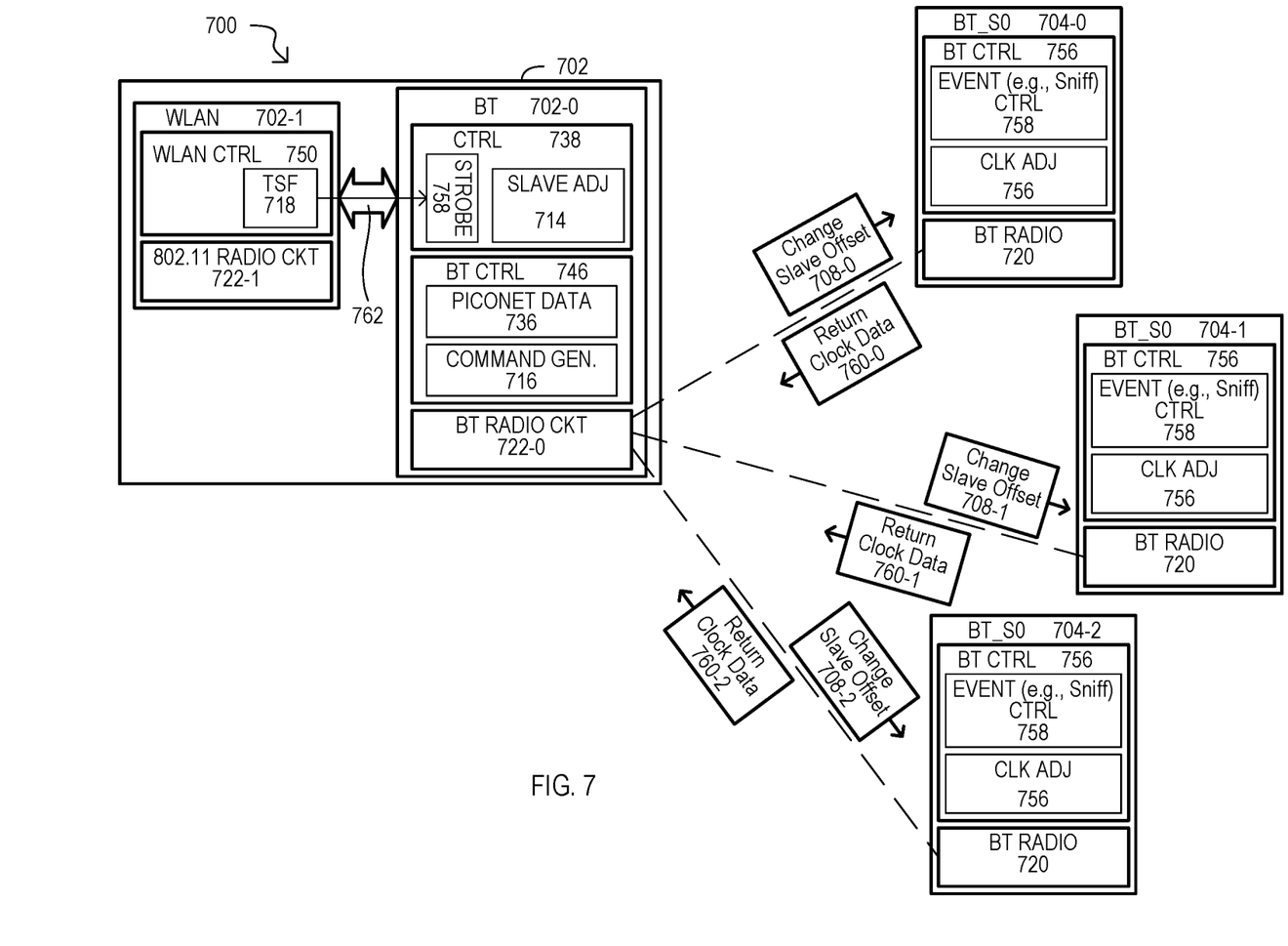
FIG. 7 is a block diagram of a piconet according to an embodiment.

FIG. 7 is a block diagram of a piconet system 700 according to an embodiment. System 700 can be one particular implementation of that shown in FIG. 1. A system 700 can include a BT master 702 and a number of BT slaves 704-0 to -2. BT master 702 can be a combination BT-WLAN device, where BT circuits coexist with WLAN circuits to share a 2.4 GHz band. Consequently, if slaves (704-0 to -2) require event windows (e.g., time periods in which sniffs take place), such event windows can be established according to each BT slave's internal clock and can be scattered in relationship with one another. This can lead to reduced throughput in WLAN operations as described herein (e.g., aggregate MPDU chopping). According to embodiments, slave events (e.g., sniff anchors) can be moved by clock dragging of slave clocks to aggregate the events in a smaller window, thus preventing possible frequent interruption of the WLAN operations on the 2.4 GHz band.

A BT master 702 can include a BT portion 702-0 and WLAN portion 702-1 in communication with one another over a bridge 762. BT portion 702-0 can include a device controller 738 and BT control circuits 746. A device controller 738 can control operations in a BT master 702, including operations in both BT portion 702-0 and WLAN portion 702-1 (via bridge 762). A controller 738 can include a strobe generator 758 and slave adjustment circuit 714. A strobe generator 758 can generate a strobe signal based on timing values provided by TSF circuit 718 in WLAN circuits 702-1. In some embodiments, such timing values can be provided by way of bridge 762. A slave adjustment circuit 714 can determine how to adjust slave circuits to aggregate event windows based on the strobe signal and timing data for BT slaves (704-0 to -2). BT control circuits 746 can control BT communications with BT slaves. BT control circuits 746 can include piconet data 736, a command generator 716, and BT radio circuits 722-0. Piconet data 736 can store data for all devices of the piconet, including slave event window and timing data. Command generator 716 can generate commands in response to requests from controller 738, including commands for adjusting slave clocks. BT radio circuits 722-0 can enable BT master 702 to communicate with BT slaves (704-0 to -2).

WLAN portion 702-1 can include a WLAN control circuits 750 and WLAN radio circuits 722-1. WLAN control circuits 750 can enable communications according to one or more IEEE 802.11 wireless protocols. At least one such protocol can share the 2.4 GHz band with BT portion 702-0. In some embodiments, WLAN portion 702-1 can also operate in a 5 GHz band.

BT slaves (704-0 to -2) can include BT control circuits 756 and BT radio circuits 720. BT control circuits 756 can include an event control section 758 and a clock adjust section 757. An event control section 758 can determine event windows for a BT slave (704-0 to -2). As but one example, when a BT slave enters a sniff mode, event control section 758 can determine sniff anchor points, as well as a time between sniffs. A clock adjust section 756 can adjust a clock within a BT slave in response to commands from a BT master.

Referring still to FIG. 7, in operation, a BT master 702 can track and/or control states of BT slaves (704-0 to -2). When a BT slave (704-0 to -2) is in a mode which requires the monitoring of event windows, BT master 702, based on timing data from the BT slaves, can determine if the event window is within a desired group window. If it is not, BT master 702 can transmit a control packet 708-0 to -2, which will cause the receiving BT slave (704-0 to -2) to adjust its event window and then return a status packet 760-0 to -2, which can indicate a new position of the event window. As noted herein, a BT master 702 can make such adjustments in any suitable fashion. In some embodiments, a BT master 702 can transmit packets which gradually change an offset value of a slave clock until it is within a desired group window.

Figure 8:
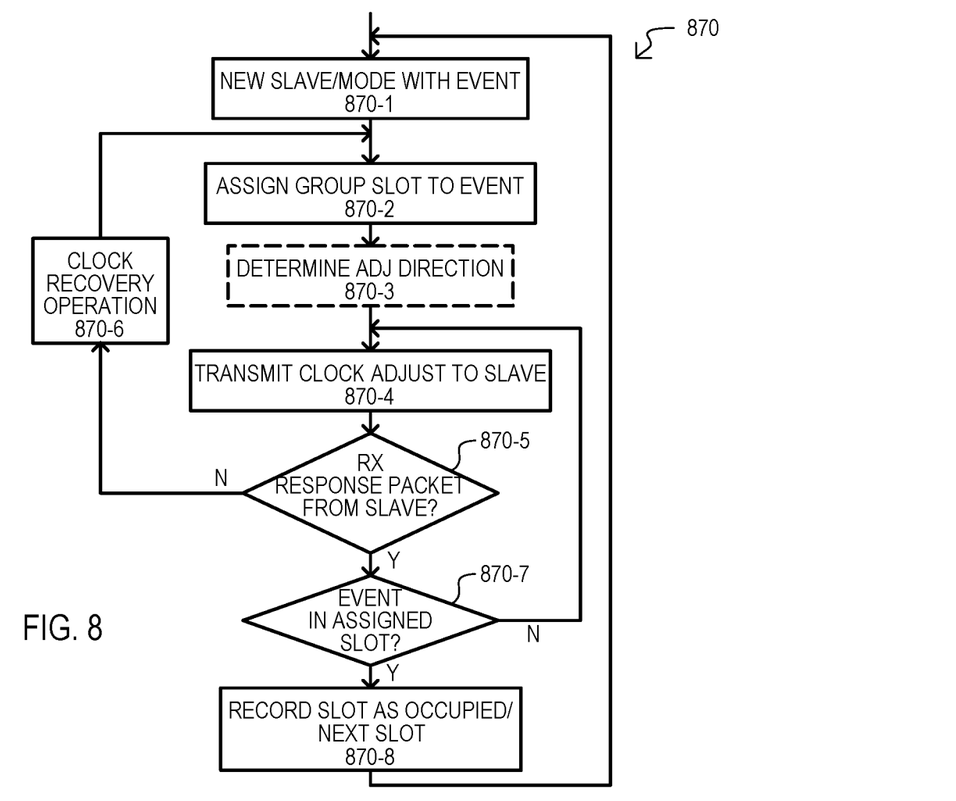
FIG. 8 is a flow diagram of a method of adjusting a slave event window timing according to an embodiment.

FIG. 8 is a flow diagram of method 870 executable by a combination/master device as disclosed herein, or equivalents. Method 870 can include a new slave device (or a slave device switching to a new mode) that includes event windows 870-1. Such an action can include a master device receiving data from a slave device that indicates the timing of the event windows. A group slot can be assigned to the event window 870-2. Such an action can include a master device determining a location of a group window relative to a strobe signal, as well as the group slot in the larger group window that the event window will occupy. Optionally, a method can determine an adjustment direction 870-3 (i.e., should the event window be moved forward or backward in time from its present location). In some embodiments, a protocol may only allow clock adjustments in one direction.

A master device can transmit a clock adjustment packet to a slave device 870-4. Such an action can include a master device transmitting a packet with an offset value for a slave clock. When the slave device updates its clock count by the offset value, an event window can move correspondingly. A master device can then wait for a response packet from the slave device. If a response packet is not received (N from 870-5), a method can implement a clock recovery operation 870-6 to ensure the adjustment did not put the master and slave devices out of synch.

If a response packet is received (Y from 870-5), a method can determine if the event window has moved into its assigned slot in a group window 870-7. If the event window still needs to be moved more (N from 870-7), a method can continue adjusting the clock (return to 870-4). If the event window is in its assigned slot (Y from 870-7), the slot can be recorded as occupied (870-8) and a master can move to a next slot in the group window and return to 870-1.

As noted above, according to embodiments a master device may communicate with a slave device according to a first protocol, but a group window into which event windows can be aggregated can be timed according to a strobe signal based on a second protocol. According to some embodiments, a master device can periodically calibrate an internal clock with the strobe. Such a method is shown in FIG. 9.

Figure 9:
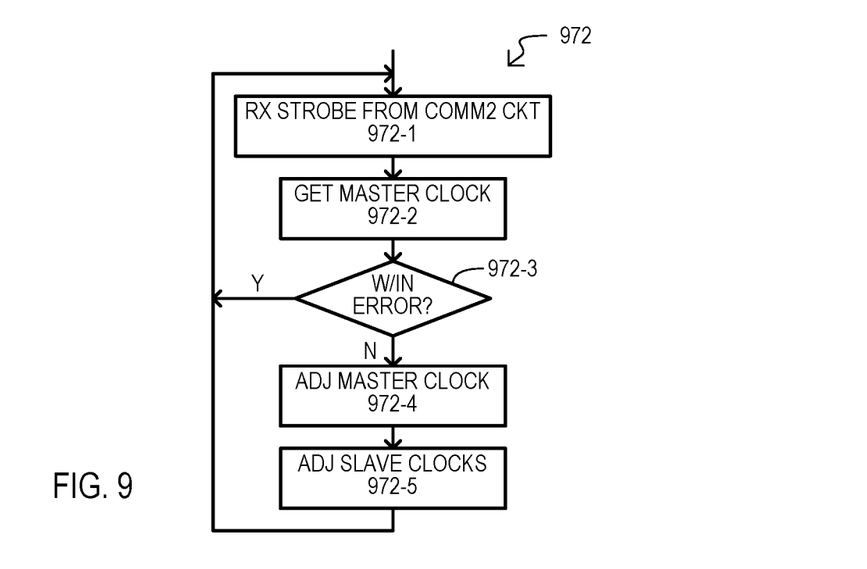
FIG. 9 is a flow diagram of a strobe calibration operation according to an embodiment.

FIG. 9 is a flow diagram of another method 972 executable by a combination/master device. A method 972 can include a combination/master device receiving a strobe signal from second communication circuits 972-1. In some embodiments, this can include a strobe signal generated from WLAN circuits. The combination/master device can get a master clock corresponding to the strobe signal 972-2. If a master clock is within an expected error (Y from 972-3), a method can wait for a next strobe (go to 972-1). If a master clock is not within an expected error (N from 972-3), the master clock can be adjusted 972-4 and the slave clocks adjusted correspondingly 972-5. In some embodiments, such an action can include a combination/master device sending a broadcast packet for all slave devices with the adjusted clock data.

FIGS. 10A to 10D are timing diagrams showing event window adjustment operations according to embodiments. FIGS. 10A to 10D show a waveform for a strobe signal, and event windows (one shown as 1030) for three slave devices SLAVE0 to SLAVE2.

Figure 10A:
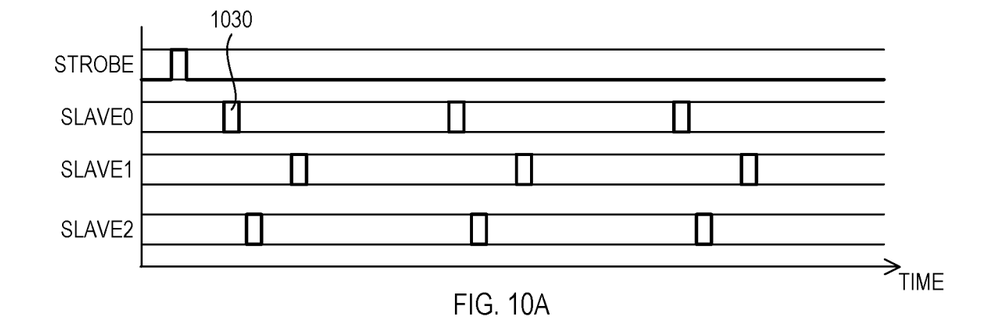
FIGS. 10A to 10D are timing diagrams showing event window adjustment operations according to embodiments.

FIG. 10A shows event windows prior to an adjustment. Event windows are not aggregated.

Figure 10B:
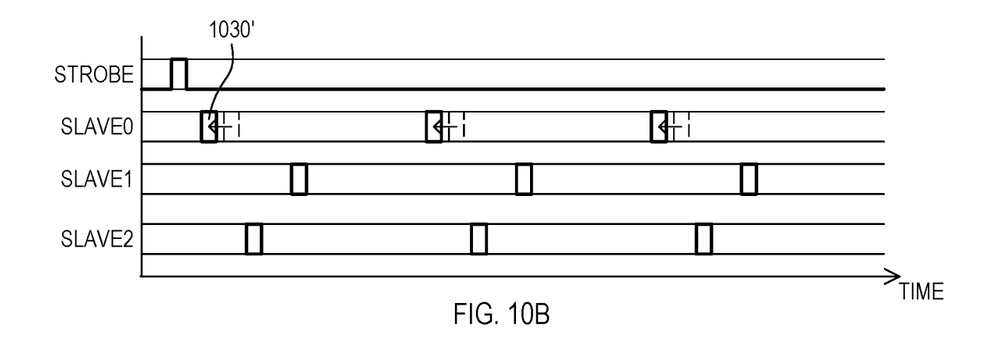

FIG. 10B shows event windows after adjustments according to a first embodiment. In the embodiment shown, a master device can adjust timing of slave devices one at a time. Thus, the event window 1030' for SLAVE0 has been moved while event windows for SLAVE1 and SLAVE2 have not been moved.

Figure 10C:
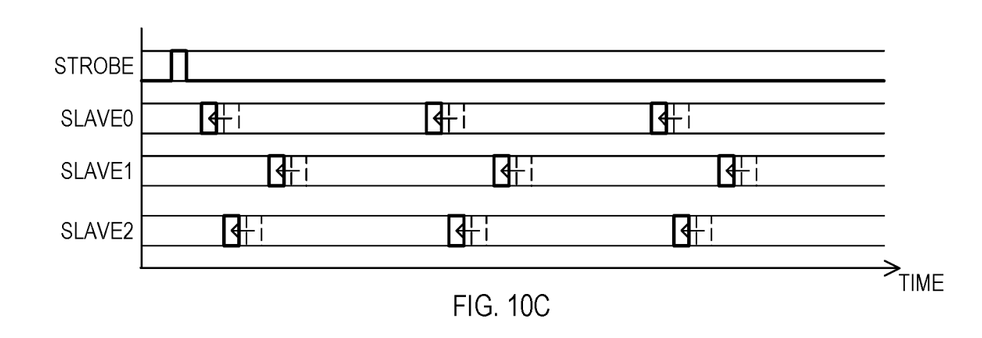

FIG. 10C shows event windows after adjustments according to another embodiment. In the embodiment shown, a master device can adjust timing of slave devices simultaneously. In some embodiments, such an action can include a master device emitting a broadcast packet for reception to all slave devices, as opposed to a packet addressed to one slave device. Thus, event windows for all slaves have been moved.

Figure 10D:
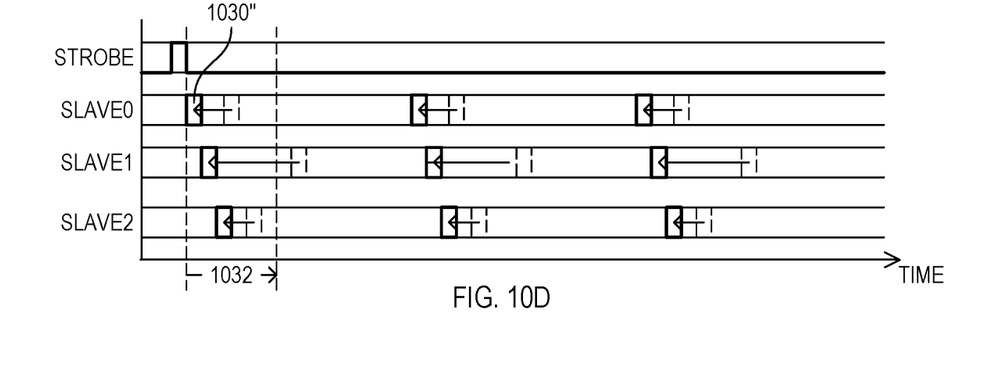

FIG. 10D shows event windows after adjustments have been completed. Adjusted event windows (one shown as 1030") have been aggregated within a group window 1032, the timing of which is based on the STROBE signal. As noted above, while FIG. 10D shows a group window 1032 essentially following the STROBE signal, in other embodiments a group window 1032 can be positioned some master clock periods after the STROBE signal.

As noted herein, in some embodiments, event windows can be periodic. However, in some systems the event windows of one slave device may occur with a different frequency than the event windows of another slave device, or such a frequency can change according to a mode of the slave device. According to embodiments, a combination/master device can adjust the slave devices to have a same event window frequency. One such embodiment is shown in FIG. 11.

Figure 11:
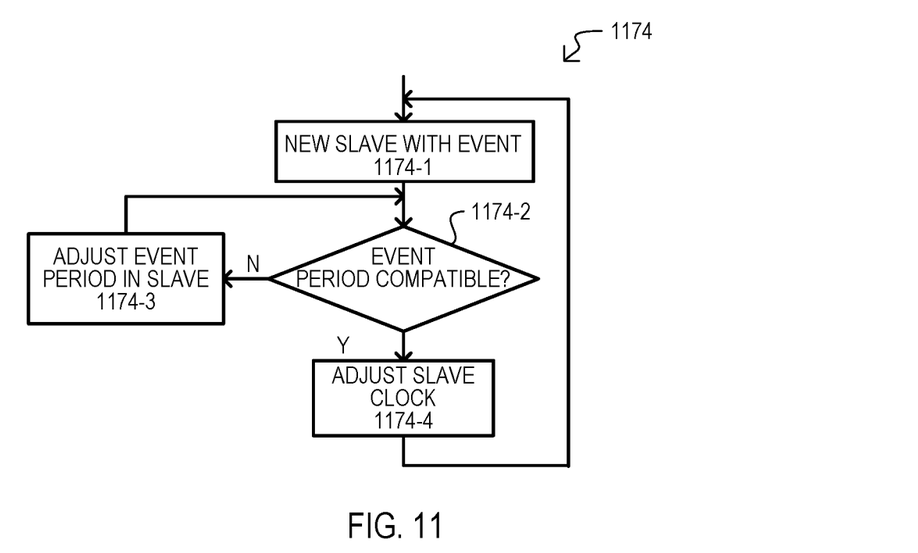
FIG. 11 is a flow diagram of a method for adjusting event periods according to an embodiment.

FIG. 11 is a flow diagram of another method 1174 executable by a combination/master device. Method 1174 can include a new slave device (or a slave device switching modes) that includes event windows 1174-1. Such an action can include a master device receiving data from a slave device that indicates the frequency of an event window (e.g., Tsniff in a sniff mode).

A method 1174 can determine if an event period is compatible 1174-2. Such an action can include determining if the new event period matches event periods of existing event windows for other slave devices (or is a multiple of such other event periods). If an event period is determined to be incompatible (N from 1174-2), a master device can adjust the event period of the device 1174-3. If an event period is acceptable (Y from 1174-2), a master device can perform clock adjustment operations (1174-4) to move the event window into a group window. Such an action can include any of the clock adjustment techniques described herein or equivalents.

Figure 12A:
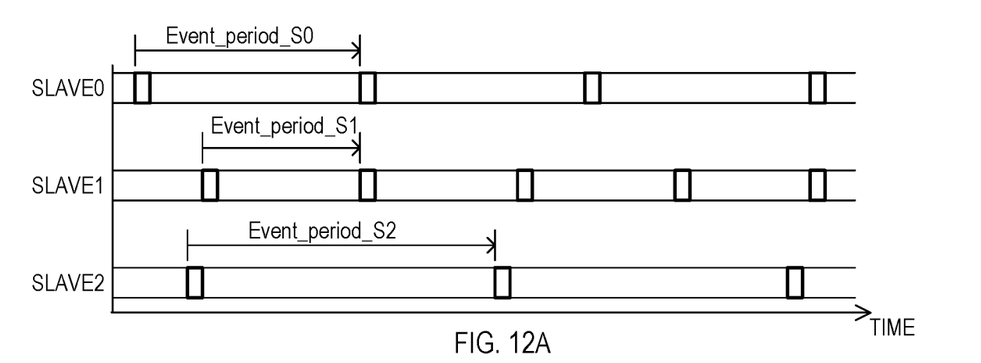
FIGS. 12A and 12B are timing diagrams showing event period adjustment operations according to an embodiment.

FIGS. 12A and 12B are timing diagrams showing a period adjustment operation like that of FIG. 11. FIG. 12A shows event windows prior to an event period adjustment. A first slave device SLAVE0 can have an event period Event_period_S0. A second slave device SLAVE1 can have an event period Event_period_S1 that is shorter than Event_period_S0. A third slave device SLAVE2 can have an event period Event_period_S2 that is longer than Event_period_S0.

Figure 12B:
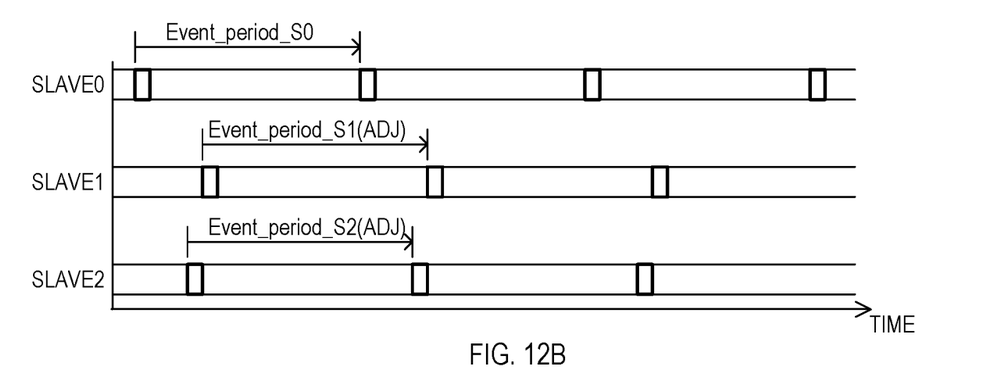

FIG. 12B shows event windows after event period adjustments according to an embodiment. An event period for SLAVE1 and SLAVE2 have been changed to match that of SLAVE0. Such an action can include a master device transmitting a packet to each slave device to be adjusted, that includes the desired event period. In response to receiving such a packet, a slave device can adjust its event period correspondingly.

Following such an event period adjustment, the event windows of slave devices SLAVE0 to SLAVE2 can be aggregated in a group window according to any of the embodiments disclosed herein or an equivalent.

Figure 13:
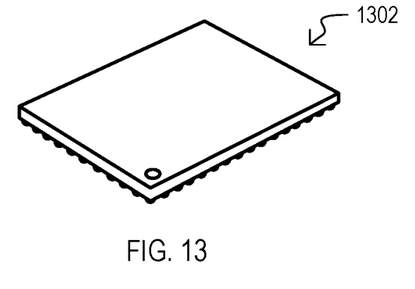
FIG. 13 is a diagram showing a combination device according to another embodiment.

While embodiments can include systems with various interconnected components, embodiments can include unitary devices which can vary control over a shared transmission medium to increase data throughput as described herein, and equivalents. In some embodiments, such unitary devices can be advantageously compact single integrated circuits (i.e., chips). FIG. 13 show one particular example of a packaged single chip combination device 1302. However, it is understood that a combination device according to embodiments can include any other suitable integrated circuit packaging type, as well as direct bonding of a combination device chip onto a circuit board or substrate.

Figure 14A:
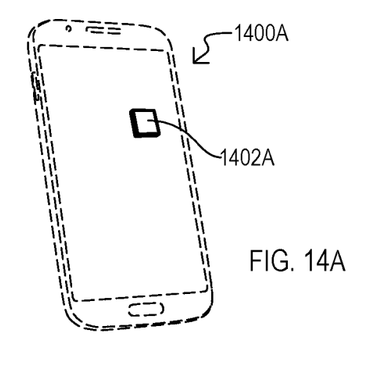
FIGS. 14A to 14D are diagrams of systems according to various embodiments.

Referring to FIGS. 14A to 14D, various systems according to embodiments are shown in series of diagrams. FIG. 14A shows a handheld computing device 1400A. Handheld computing device 1400A can include a combination device 1402A that can aggregate event windows of slave devices for higher throughput as described herein, or equivalents.

Figure 14B:
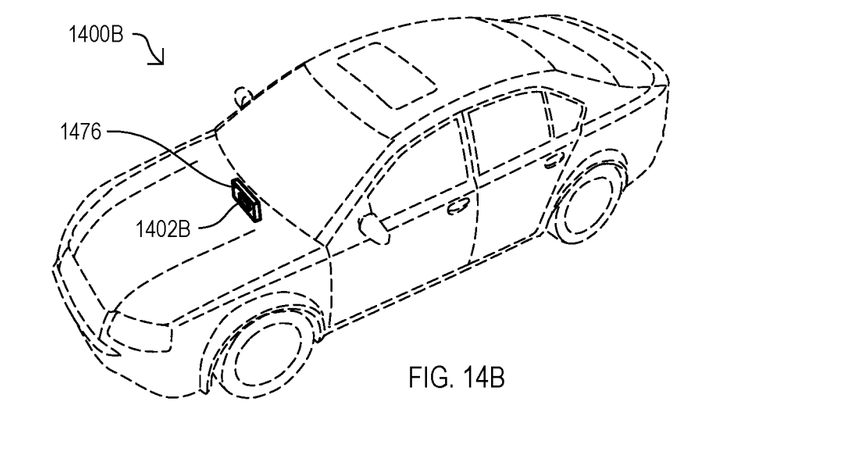

FIG. 14B shows an automobile 1400B that can have numerous sub-systems, including a communication subsystem 1476. In some embodiments, a communication subsystem 1476 can enable an automobile to provide WiFi communications as well as enable other devices to pair to the system via Bluetooth. Communication subsystem 1476 can include a combination device 1402B as described herein, or equivalents, to provide greater throughput for WiFi communications.

Figure 14C:
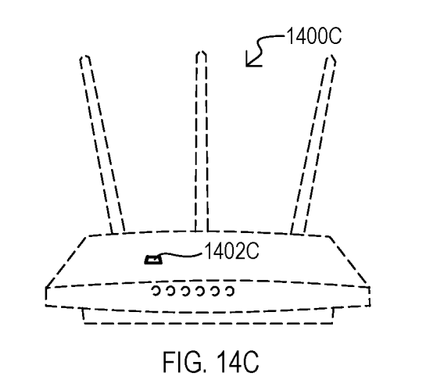

FIG. 14C shows a router device 1400C. Router device 1400C can provide routing functions for a relatively large range protocol (e.g., WLAN) while also enabling access via a closer range protocol (e.g., Bluetooth). Router device 1400C can include a combination device 1402C as described herein, or equivalents.

Figure 14D:
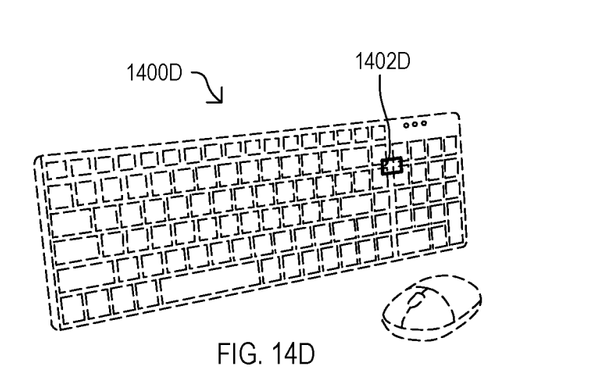

FIG. 14D shows a human interface device 1400D. Human interface device 1400D can enable a person to interact or control other devices. As but a few of many possible examples, human interface device 1400D can control a computing system, manufacturing equipment or other systems. Human interface device 1400D can include a combination device 1402D as described herein, or equivalents.

Embodiments described herein are in contrast to conventional combination devices in which a wireless network can include slave devices having various event window timings that are not organized, and thus can take over access to a shared medium at various time periods. According to embodiments, higher throughput for a WLAN portion can be achieved by aggregating BT events (e.g., sniffs) into a limited window, freeing up the shared medium for greater amounts of time.

These and other advantages would be understood by those skilled in the art.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
    in a master device, generating a strobe signal from a clock configured to synchronize communications of a first communication protocol;
    by operation of the master device, determining event timing windows of a second communication protocol for a plurality of slave devices of the master device;
    by operation of the master device, establishing an event group window that is synchronous with the strobe signal;
    by operation of the master device, if an event timing window of a slave device is not in the event group window, transmitting at least one clock adjustment packet to the slave device configured to cause the slave device to adjust the event timing window to move toward the group window;
    by operation of the master device, continuing to transmit clock adjustment packets to slave devices until the event timing windows of the slave devices are sequentially ordered within the event group window.

2. The method of claim 1, wherein:
    each event timing window has a duration t1, the number of slave devices is N, and the event group window has a duration no greater than 3N*t1.

3. The method of claim 1, wherein:
    the master device is formed in a combination device having first communication circuits that operate according to the first communication protocol and second communication circuits that operate according to the second communication protocol; and
    the first and second communication protocols share a transmission medium, the transmission medium being a range of frequencies.

4. The method of claim 3, wherein:
    the combination device is an integrated circuit device.

5. The method of claim 1, wherein:
    the first communication protocol includes at least one IEEE 802.11 standard, the timing signal is generated with the time synchronization function of the at least one IEEE 802.11 standard; and
    the second communication protocol includes at least one Bluetooth standard.

6. The method of claim 1, further including:
    transmitting the at least one clock adjustment packet limits clock adjustments in the slave device to a predetermined maximum value, and
    by operation of the master device, receiving a clock data packet from each slave device, and if a slave device event timing window is not within the event group window after the clock adjustment, transmitting another clock adjustment packet to the slave device.

7. The method of claim 1, further including:
    by operation of the master device, wirelessly receiving event frequency information for slave devices; and
    if the event frequency information indicates that there are differences in event frequencies between slave devices, by operation of the master device, transmitting control packets addressed to the slave devices that are configured to adjust event frequencies of the slave devices to a same event frequency.

8. A device, comprising:
    first communication circuits configured to receive and transmit data over at least a first medium according to a first protocol, the first communication circuits including a clock circuit to synchronize operations according to the first protocol;
    second communication circuits configured to receive and transmit data over at least the first medium according to a second protocol, the second communication circuits configurable as a master device according to the second protocol; wherein
    the device is configured to
        generate a strobe signal from the clock circuit,
        establish an event group window synchronous with the strobe signal,
        determine initial positions for event timing windows according to the second protocol for a plurality of slave devices,
        if an event timing window of a slave device is not in the event group window, transmit at least one clock adjustment packet addressed to the slave device configured to cause the slave device to move the event timing window toward the event group window, and
        continuing to transmit clock adjustment packets to slave devices until the event timing windows of the slave devices are sequentially ordered within the event group window.

9. The device of claim 8, wherein:
    each event timing window has a duration t1, the number of slave devices is N, and the event group window has a duration no greater than 3N*t1.

10. The device of claim 8, wherein:
    the first protocol includes at least one IEEE 802.11 standard, and the clock circuit is a clock circuit for a time synchronization function circuit; and
    the second protocol includes at least one Bluetooth standard.

11. The device of claim 8, wherein:
    the master device is further configured to
        transmit a clock adjustment command to each slave devices that limits clock adjustments to a predetermined maximum value, and
        receive a clock data packet from the slave devices, and if a slave device event timing window is not within the event group window after the clock adjustment, transmit another clock adjustment command to the slave device.

12. The device of claim 11, wherein:
the timing circuit operates according to a first clock operating at a first frequency; and
the master device transmits data according to a master clock having a second frequency; wherein
the first frequency is less than the second frequency.

13. The device of claim 8, wherein:
the first medium includes frequencies of about 2.4 GHz.

14. The device of claim 8, wherein;
first communication circuits are further configured to receive and transmit data over a second medium that does not overlap the first medium; and
the second communication circuits do not receive and transmit data over the second medium.

15. A system, comprising:
a plurality of slave devices, each slave device including a slave controller configured to establish periodic event timing windows based on a slave clock; and
a master device that includes
first communication circuits operating according to a first clock circuit and a first communication protocol,
second communication circuits in wireless communication with the slave devices according to a second communication protocol, the second communication circuits configured to
generate a strobe signal from the first clock circuit,
establish an event group window that is synchronous with the strobe signal,
if an event timing window of a slave device is not in the event group window, transmit a clock adjustment command to the slave device to move the event timing window toward the event group window; and
continue to transmit clock adjustment commands to the slave devices until the event timing windows of the slave devices are sequentially ordered within the event group window.

16. The system of claim 15, wherein:
each event timing window has a duration t1, the number of slave devices is N, and the event group window has a duration no greater than 3N*t1.

17. The system of claim 15, wherein:
each slave device includes a slave clock circuit that generates the slave clock by adding an offset value to a base clock value; and
the first communication circuits transmit clock adjustment commands which alter the offset value of the slave device.

18. The system of claim 15, wherein:
the first protocol includes at least one IEEE 802.11 standard, and the first clock circuit is for a time synchronization function circuit; and
the second protocol includes at least one Bluetooth standard.

19. The system of claim 15, wherein:
a first and second communication circuits are formed in a same integrated circuit substrate.

20. The system of claim 15, wherein:
the first communication circuits are configured to receive and transmit data over a first medium and a second medium; and
the second communication circuits are configured to receive and transmit data over the first medium but not the second medium; and
the first and second mediums are non-overlapping frequency ranges.

* * * * *